(12) United States Patent
Chow (10) Patent No.: US 9,730,300 B2
(45) Date of Patent: Aug. 8, 2017

(54) WIRELESS LIGHTING CONTROL SYSTEM AND ITS APPLICATION THEREOF

(71) Applicant: En-trak Hong Kong Limited, Hong Kong (HK)

(72) Inventor: Kong Meng Vincent Chow, Hong Kong (HK)

(73) Assignee: En-trak Hong Kong Limited, Hong Kong (HK)

( * ) Notice: Subject to any disclaimer, the term of this patent is extended or adjusted under 35 U.S.C. 154(b) by 0 days.

(21) Appl. No.: 15/140,456

(22) Filed: Apr. 27, 2016

(65) Prior Publication Data

US 2017/0055333 A1    Feb. 23, 2017

(51) Int. Cl.
*H05B 37/02* (2006.01)
*H05B 33/08* (2006.01)

(52) U.S. Cl.
CPC ..... *H05B 37/0272* (2013.01); *H05B 33/0815* (2013.01); *H05B 33/0845* (2013.01); *H05B 37/0218* (2013.01); *H05B 37/0281* (2013.01)

(58) Field of Classification Search
CPC ............ H05B 33/0815; H05B 33/0845; H05B 33/0857; H05B 37/0218; H05B 37/0272
USPC .................................................. 315/307, 312
See application file for complete search history.

(56) References Cited

U.S. PATENT DOCUMENTS

| 2013/0271004 | A1* | 10/2013 | Min | H05B 33/0842 |
| | | | | 315/112 |
| 2016/0262242 | A1* | 9/2016 | Hu | H05B 37/0272 |
| 2017/0111979 | A1* | 4/2017 | Barna | H05B 37/0272 |

* cited by examiner

*Primary Examiner* — Tung X Le
(74) *Attorney, Agent, or Firm* — Wayne & King LLC (57) ABSTRACT

The present invention generally relates to a wireless lighting control system and its application thereof, particularly for commercial application. Said wireless lighting control system mainly involves a novel communication protocol developed for functioning of the said lighting control system, which allows users to remotely control on/off, configure different layouts and settings, and time schedule the operation of different types of lighting fixtures including LEDs.

13 Claims, 7 Drawing Sheets

WIRELESS LIGHTING CONTROL SYSTEM AND ITS APPLICATION THEREOF

CROSS-REFERENCE TO RELATED APPLICATIONS

This application claims the priority benefit of a Hong Kong patent application No. 15108087.0, filed on Aug. 20, 2015. The content of the aforementioned application, including any intervening amendments thereto, is incorporated herein by reference.

FIELD OF THE INVENTION

The present invention generally relates to a wireless lighting control system and its application thereof, particularly for commercial application. Said wireless lighting control system mainly involves a communication protocol developed for functioning of the said lighting control system, which allows users to remotely control on/off, configure different layouts and settings, and time schedule the operation of different types of lighting fixtures including LEDs. This wireless lighting system and can be used with existing lighting fixtures also.

BACKGROUND AND PRIOR ARTS

Towards controlling the misuse of power it is always important to have effective arrangement to regulate lighting in a commercial place or a public place, namely offices, factories, hotels, hospitals, show-rooms, railway stations, streets etc. There are certain manual means available for switching individual or a group of lighting fixtures on or off using certain switches. One can control the lighting by turning the on/off switches on the wall. Which switch controls which light or sets of lights is pre-determined during the construction or renovation stage. It is thus expected that the last person leaving the office will manually turn off the light using the switch.

To reduce energy wastage due to people leaving lights on unnecessarily, some may choose to invest in a timer-based lighting control system. This timer system allows user to manually set pre-defined time of operation according to day-of-week to control when different group of lights will turn on or off at the pre-defined timing.

Depending on how the existing light fixtures are wired together during the renovation or construction phase, user cannot freely decide how they wish to configure and group the light fixture. For example, if switch #1 is wired to control the lobby and reception area lights, one can only install the timers to control when the lobby and reception lights operate. If the user wishes to control and set timing for these two areas separately, they will need to re-wire the electrical connection to do so.

ZigBee is a mesh network specification for low-power wireless local area networks (WLANs) that cover a large area. It is a global open language for wireless high-level communication protocols. Based on the IEEE 802.15.4 standard, ZigBee can be used to create a personal area networks built from small, low-power digital radios. Depending on its power output and environmental characteristics, ZigBee devices can transmit data over long distances by passing data through a mesh network of intermediate devices to reach more distant ones. ZigBee networks are secured by 128 bit symmetric encryption keys with a defined rate of 250 kbit/s which mean they are best suited for intermittent data transmissions from a sensor or input device.

By utilizing ZigBee technology, a novel smart lighting control system is being proposed herein, which is a wireless lighting control solution that allows users to remotely (1) control, (2) configure and (3) schedule any existing lighting in any locations.

The major advantage of the proposed lighting control system over stand-alone lighting controls or conventional manual switching is the ability to control individual lights or groups of lights from a single user interface device and can be used on existing lighting fixtures, regardless of the existing wiring circuitry. This ability to control multiple light sources from a user device allows complex lighting scenes to be created. A room may have multiple scenes pre-set, each one created for different activities in the room. A major benefit of lighting control systems is reduced energy consumption. Longer lamp life is also gained when dimming and switching off lights when not in use.

Wireless lighting control systems provide additional benefits including reduced installation costs and increased flexibility over where switches and sensors may be placed.

Other than installing conventional timers to control the light operation, there are also other so-called 'smart lighting' in the market. There are several major advantageous differences between the systems of instant invention over that of conventional offerings:

The conventional smart lightings are primarily focused on the smart home market, while the main object of the proposed system of the instant invention is capable of controlling large lighting networks with diverse lighting profiles in a commercial building or in the public place.

All conventional smart lighting systems use WIFI as their communication protocol. The proposed wireless lighting control system functions through its own novel wireless communication protocol, suitable for a large area.

All conventional smart lightings require users to purchase a new set of lighting units as their so-called smart mechanism is embedded within the lighting fixture itself. The wireless lighting control system, as proposed herein is particularly suited for retrofitting applications since it can re-use all the existing lightings without buying new ones, or it also be used for new lightings.

All other smart lightings allow users to switch on/off a limited number of lighting units due to the limitation of WIFI overbearing the network, particularly up to 10 lighting units in the network. The proposed wireless lighting control system herein has no limitation to the number of light sets that can join the network.

Object of the present invention is to propose a novel wireless lighting control system, particularly to control and manage the lighting operations in a commercial or public place; wherein said wireless lighting control system provides very high level of flexibility to the user towards controlling the lighting operations and to maximize the energy savings from the lighting system, without requiring re-wirings and/or purchasing new lightings.

Another object of the present invention is to propose a method to control lighting devices, preferably located in remote locations in large number within the personal network of the said wireless lighting control system, created preferably as a ZigBee mesh network.

Further another object of the invention is to propose a web based control platform to be installed in the data processing, controlling and transmitting unit of the said wireless lighting control system, wherein said control platform is characterized in sending the instructions from a desktop computer or a web-enabled device (namely mobile phone) to the said data processing unit of the lighting control system (the Gateway module of the said system herein) and wherein said software platform is further characterized in transmitting the wireless command from the Gateway module of the system to one or more controller(s), each responsible for power supply to one lighting device.

Further another object of the invention is to propose a method of wireless lighting control using the proposed wireless lighting control system; wherein said method includes (i) selection of optional group of lighting devices for simultaneous wireless control; (ii) scheduling of the wireless lighting control for individual lighting device or groups of lighting devices towards power on/off at optionally selected date and time or delaying the already made such schedule; and (iii) storing the instruction for wireless lighting control of one lighting device or groups of lighting devices to the memory of the Gateway module for realizing said instruction in any future time.

DESCRIPTION OF THE INVENTION

The present disclosure generally relates to a smart lighting control solution for commercial applications. It is a stand-alone lighting control system involving a robust wireless communication protocol as an integral part of the proposed system, wherein said wireless lighting control system allows users to remotely control on/off, configure different layouts and settings, and time schedule the operation of different types of lighting fixtures, including LEDs.

Said wireless lighting control system is ideal for smart buildings and office applications, delivering significant energy savings and improving both cost and operational efficiency for the users. It is designed to deliver intelligent web-based control of any number of existing lighting fixtures.

Said wireless lighting control system comprises a mesh network specification for low-power wireless local area networks (WLANs) that cover a large area. Said lighting control system with self-defined mesh network can be used to create a personal area networks built from small, low-power digital radios, created preferably as a ZigBee mesh network. Depending on its power output and environmental characteristics, said system can transmit data over long distances by passing data through a mesh network of intermediate devices to reach more distant ones. The wireless mesh networks for the proposed wireless lighting control system, in one of the most preferred embodiment of said system, are secured by symmetric encryption keys with a defined rate; which mean they are best suited for intermittent data transmissions from a sensor or input device.

By defining such wireless mesh network and the module for intermittent data transmissions from a sensor or input device therein; the present wireless lighting control system is so designed that it allows users mainly to remotely (i) control, (ii) configure and (iii) schedule any existing lighting in any locations.

The wireless lighting control system, as disclosed herein, essentially consists of three key components namely: (i) Gateway, (ii) Wireless Controller, and (iii) Web-based Control Platform.

The Gateway is the key component of the system. Said Gateway comprises of a Data module, the processor module, the network module and data alert module. Said Date module receives all instruction data provided by a web-host server; basically send by the user using a desk-top computer or any web-enabled device. The processor module of the Gateway processes all optional instruction data to its database. The network module mainly creates a personal mesh network, creates preferably as a ZigBee mesh network, wherein said all the lighting fixtures controlled and managed by the proposed wireless lighting control system are covered within the said personal network. The data alert module of the Gateway generates the command data and transmits it as RF communication (or beacons) to remotely placed controllers in the said personal mesh network, wherein said command data are particularly based on instruction provided by the user.

The Gateway module receives instruction (on/off), otherwise known also as beacons, from the users via the software platform and/or any web-enabled device through any wireless communication. This instruction is relayed to each controller which is electrically connected to one or many existing lightings via the defined wireless mesh network and its intermittent data transmission module thereof. From the software platform or mobile application, user can remotely control on/off function of any connected lighting fixture(s). In addition, users can easily configure any single lighting fixture to belong to any groupings, independent of the existing electrical wiring layout. Furthermore, user can pre-load multi-year calendar and schedule when they would like to turn on/off the lights during different dates.

Remote Control On/Off:

The user can easily remotely control the on-off operation of individual light or light set from any computer or web-enabled device. When a command is sent from the user via the computer or mobile application the relay switch, which controls the flow of electrical current flowing from the main power supply to the light, will turn the light on or off.

The said wireless lighting control system is a programmable system which supports grouping multiple connected electrical devices into different zones. Devices within the zones can be controlled all together. They can be delayed to turn on/off (e.g. 1 hour later) and can also be scheduled to switch on/off based on weekdays (e.g. every Sunday) and/or time (e.g. every Monday to Friday 9:00 am). The system has an internal clock with time zone support which is set to synchronize with the internets time server (e.g. HK Observatory) using the NTP protocol constantly. This allows the system to operate precisely even if it is disconnected from the internet.

Grouping:

In the software platform, user can easily drag-and-drop any one or many light fixtures (according to the unique ID of each controller) to form groups—independent of how the existing lights are wired together. The user can easily configure and group the pantry area lights with the basement car parking lights together into one single group.

Every connected device within the wireless lighting control system has a unique identifier. The unique identifier can be retrieved through API and used for labeling and further control (e.g. delayed on/off). Individual device can also be grouped into different zones. Devices within the zone can be freely moved in and out. Every zone is assigned a system generated unique identifier with all operations are executed through API by providing the zone identifier or device identifier.

Scheduling:

Another important feature of proposed wireless lighting control system is scheduling the lighting functions in its network. The software platform of the said system is pre-loaded with a calendar of preferably three years with all public holidays marked into the system. Users can easily select and determine how they would like to operate their office lighting during working days and holidays.

Said wireless lighting control system, its hardware and various components therein, and the application of said system towards controlling multiple lighting devices using the desktop computer or a web-enabled device is substantially described herein below with the help of certain schematic drawings representing the most preferred embodiment of the said proposed system herein.

Figure 1:
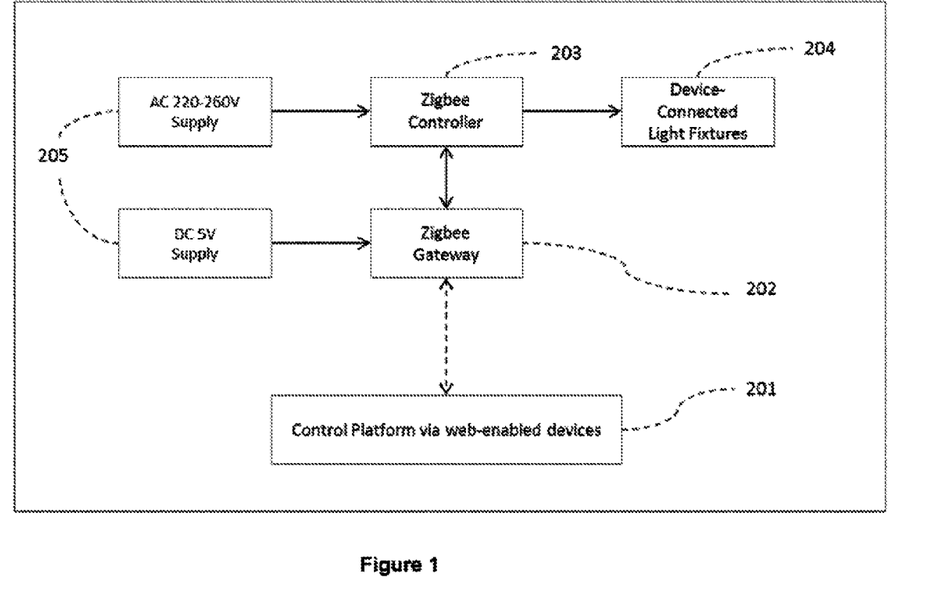
FIG. 1: Schematic diagram to represent the complete methodology of controlling lighting fixtures through desktop computer or other web-enabled device, using mechanism of the said wireless lighting control system.

FIG. 1 indicates basic working strategy for controlling different kind of lighting arrangements, wherein the user instructs the Gateway (202) of the wireless lighting control system from his desktop computer or a web-enabled device like mobile phone (201) and consequently the data module of the Gateway (202) receives the instruction data and forward it to the processor module for further processing. Processor module of the Gateway (202) processes the wireless data/instruction received from device (201) as per the optional mode of control for lighting fixtures (individual or in groups), already selected in the memory therein and through the alert module therein sends the command to each of the controllers (203), so that these controllers accordingly follow the command of said Gateway module (202) to turn or/off the power supply to their corresponding lighting fixtures (204), present in the personal mesh network of the said wireless lighting control system. The Gateway (202) and Controller (203) are connected to power source (205).

Figure 2:
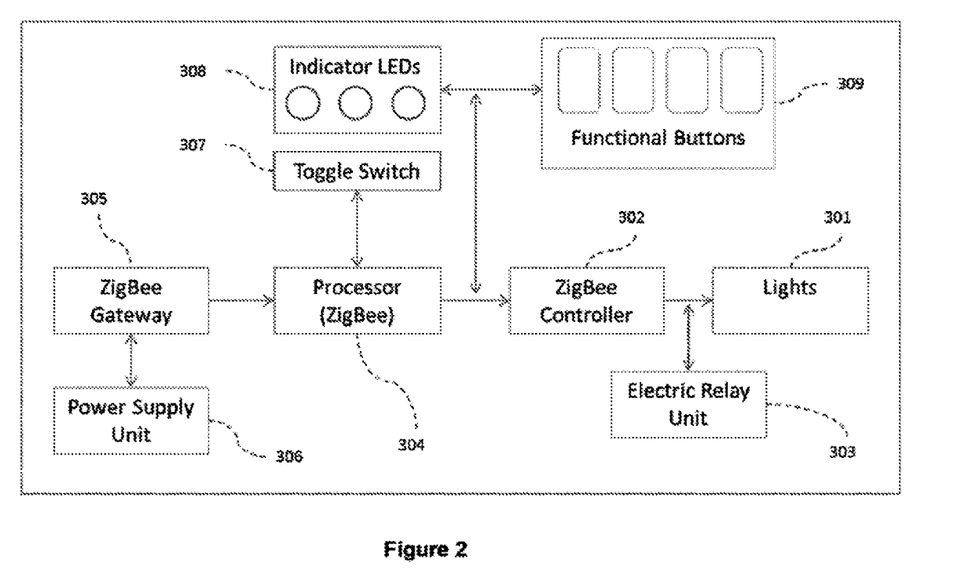
FIG. 2: Schematic scheme for controlling lighting device(s) using the said wireless lighting control system.

FIG. 2 indicates that the said lighting control system interferes between the main AC power supply unit (306) and the lighting devices (301), wherein the Gateway unit (305) comprising the processor (304) of said control system coordinates with the controller (302), assembled with said lighting device (301). When the Gateway (305), through its processor (304) dispatches command to the controller (302), fitted with a an electrical relay switch (303), which controls the flow of electrical current to the lighting fixture (301) with a simple high/low signal. Wireless data transmission from said Gateway (305) to said controller (302) and optional functions of user therein are indicated and supported with toggle switch (307), indicator LEDs (308), and functional buttons (309).

Figure 3A:
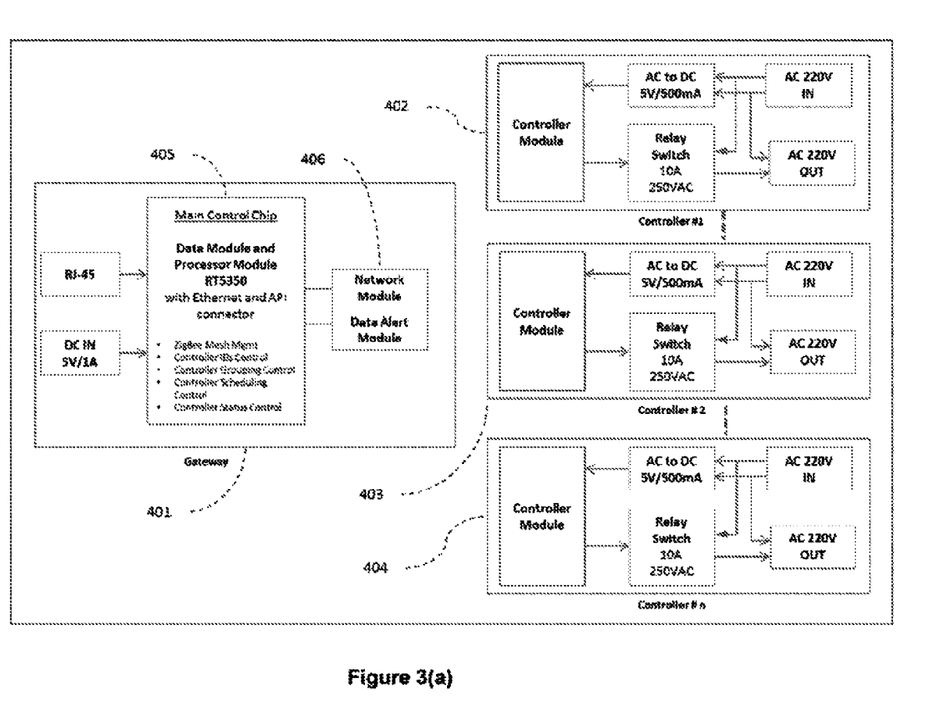
FIG. 3(a): Schematic and basic representation of the mesh network of the said wireless lighting control system, including the Gateway module and multiple controller modules, associated with lighting fixtures.
Figure 3B:
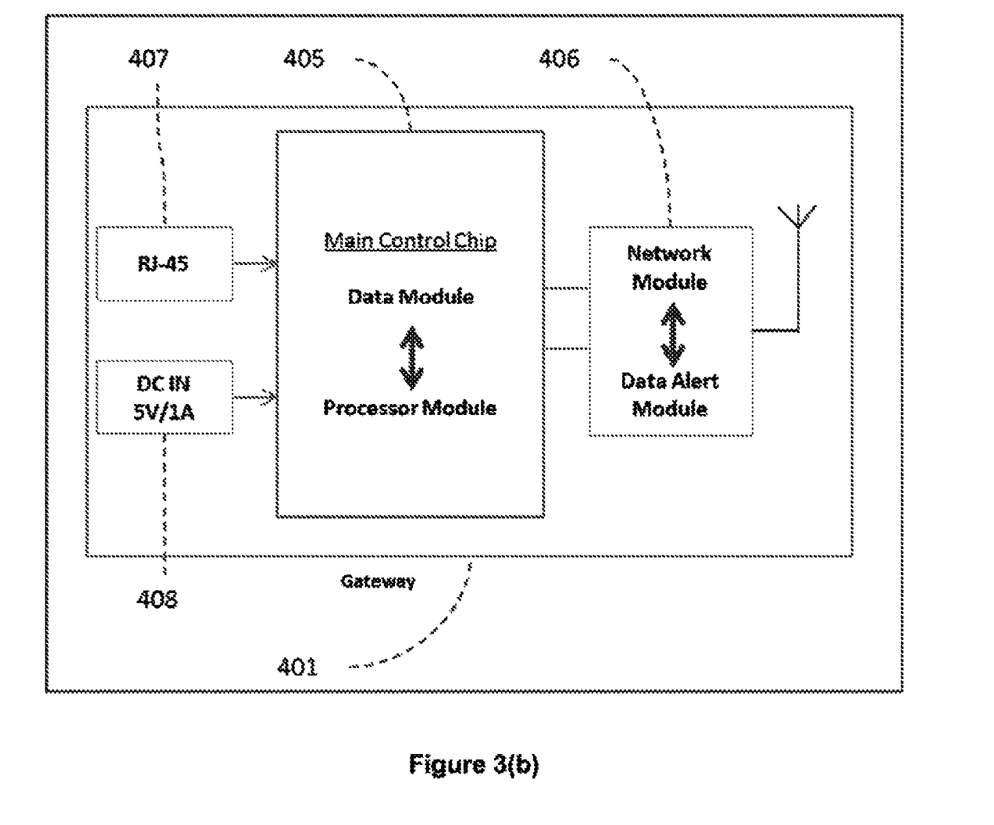
FIG. 3(b): Schematic representation of the basic hardware of the Gateway module.

The Gateway (401) in FIGS. 3(a) and (b) is the key component of the system. The Gateway receives instruction from the user from their desktop computer or any web-enabled device via any wireless mechanism including WIFI or LAN connection through standard RJ-45 connector (407). Within the Gateway unit (401), there is preferably a system-on-a-chip (SoC) (405), which will process the incoming instruction from the client side.

The SoC (405) is the main control chip board, embeds with all data processing provisions, preferably comprising of data module and the processor module. Using a highly efficient DMA engine and hardware data processing accelerators, the SoC (405) frees the CPU for user applications. Inside the Gateway (401) there is also the chipset (406) integrated with said SoC (405). These chipsets (405) and (406) are integrated and combined together, and comprise data module, processor module, network module and the network module. Duly embedded chipset (406)—preferably a high performance ZigBee RF transceiver, comprises in-system programmable flash memory and thus is capable of forming a robust personal ZigBee network for the functioning of the proposed system and particularly to enable the Gateway (401) to communicate with one or many controllers (402), (403), (404) and so on, indicated by (414) as $n^{th}$ number of controller in the network.

Said SoC (405) in the Gateway is the master control chip towards whole wireless lighting control function of the said system. It is further primarily responsible for Ethernet management, software Application Programming Interface (API) management, its personal ZigBee network management, naming of node devices, group controlling for node devices, timing control for node devices, and status control for node devices. The chipset (406) is so configured with said SoC (405) that they complement each other's function in wireless lighting control throughout its personal mesh network.

Said system-on-a-chip (SoC) (405) mainly provisioned with the date module and the processor module, and it processes the instruction date regarding power On/Off to one or more lighting devices or re-configuring the lighting devices in new groups or rescheduling the power On/Off timing for them. With the active integration of SoC (405) with chipset (406) and the provisions made therein, the processor module either transfers the corresponding data to the alert module for sending command instruction to the controllers present at remote locations or stores such data into its memory for future application.

Figure 3C:
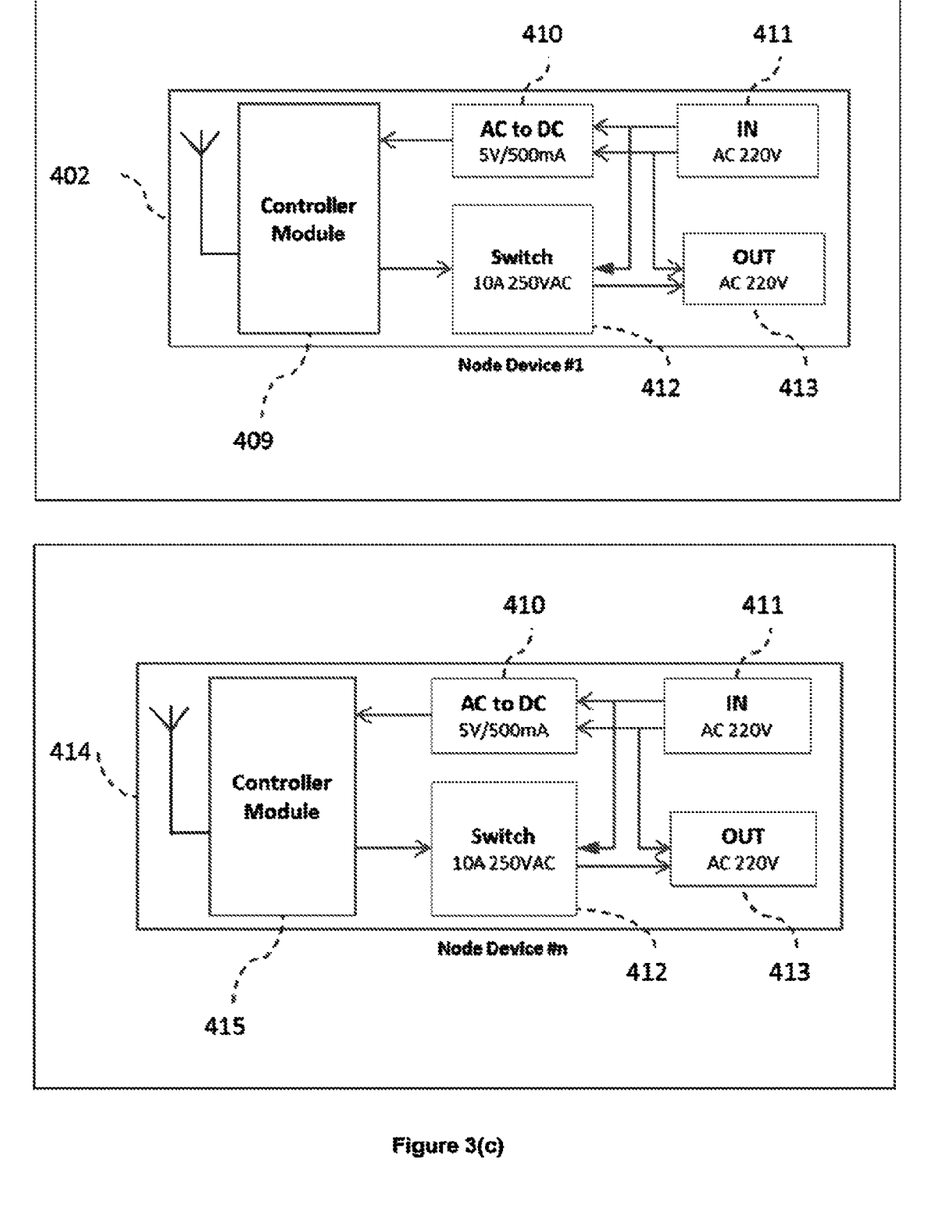
FIG. 3(c): Schematic representation of the controller and the scheme for its functioning.

Controllers (402), (403), (404) indicated in FIGS. 4(a) and (c) are also known as endpoint receives RF communication (or beacons) from the Gateway (401). When it receives the beacons, the controller module (409) will decode and respond to the command by turning on or off the light of the light fixtures. The controller module (409) receives supply of DC through (410) converting the main AC supply from (411). The controller receives beacons in regular intervals and in between the times of the transmitting the beacons, the controller remains in a low-power sleep state. When a beacon is transmitted, the controller will become active. Each controller is assigned a unique ID code inside the chipset. This allows the user to identify each controller and assigned specific functions to one or group of IDs. Each controller is fitted with a 0A electrical relay switch (412) which can control the flow of electrical current to the lighting fixture (413) with a simple high/low signal.

With the most preferred embodiment of the proposed wireless lighting control system as illustrated in the FIGS. 1 to 5, herein, the user can easily remotely control the on-off operation of individual light or light set from any computer or web-enabled device. When a command is sent from the user via the computer or mobile application the relay switch (412), which controls the flow of electrical current flowing from the main power supply (411) to the light, will turn the light (413) on or off.

Every connected lighting device within the wireless lighting control system has a unique identifier, provided with the controller connected with that particular lighting device. Thus as per schematic drawing of FIG. 4, the Gateway unit (501) of said control system reads said unique identifier, through API therein used for labeling and further control (e.g. delayed on/off). User can group individual lighting devices into different zones, for example as (502), (503) and (504) for remote control. Within the mesh network of the proposed wireless lighting control system, user can configure each lighting device to different group zones, particularly by sending one or another optional instruction from a desktop computer or any web-enabled device to the system's controller in the Gateway unit (501) and simple drag-and-drop functions made available by the software platform of the proposed wireless lighting control system herein to the user's computer or other such web-enabled device. Lighting devices, within the zone, can be freely moved in and out. Every lighting zone is assigned a system generated unique identifier with all operations are executed through (API) by providing the zone identifier or device identifier. Though the wireless control system is made applicable to all lighting devices, individual or in grouped fashion, present in the mesh network of the system, such lighting devices are also conventionally connected to manual switches (505), either individually or in a particular set of lighting devices. Existing lighting switches (505) control each row of lights in scenario shown in FIG. 4.

Figure 4:
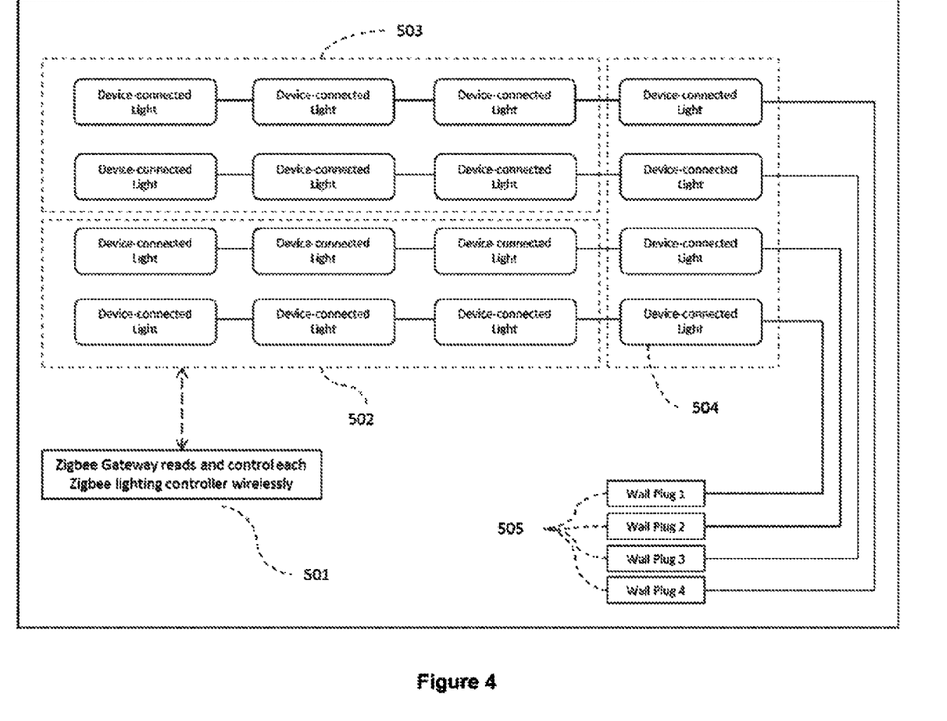
FIG. 4: One optional schematic scheme for selecting group of many lighting fixtures, present in the personal mesh network of the system, towards simultaneous wireless control through the proposed wireless lighting control system.
Figure 5:
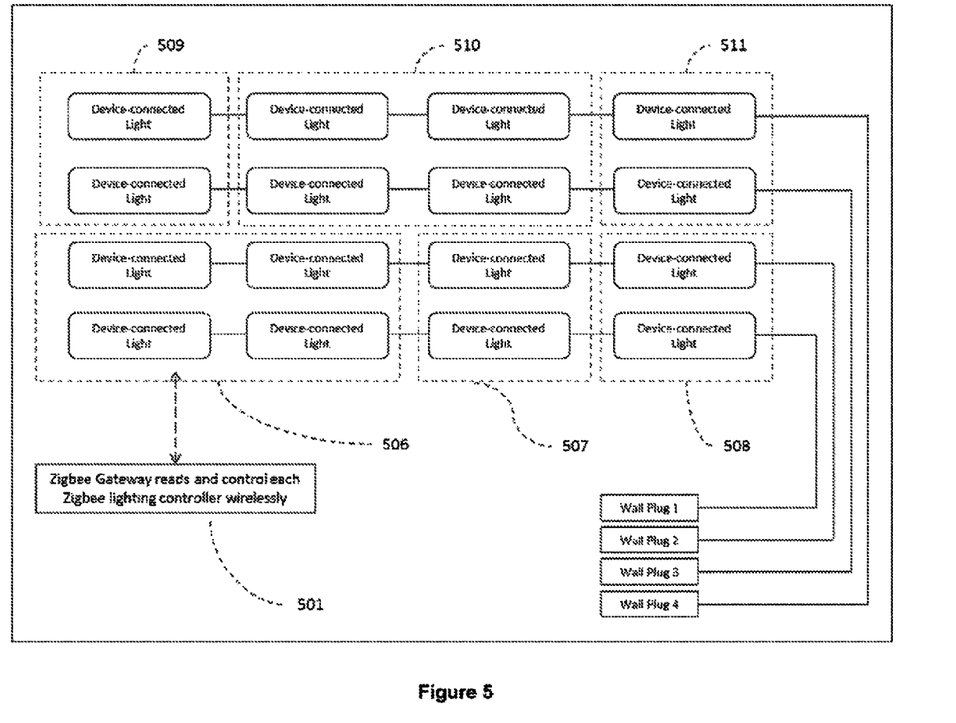
FIG. 5: Another optional schematic scheme for selecting group of many lighting fixtures, present in the personal mesh network of the system, towards simultaneous wireless control through the proposed wireless lighting control system.

Again in FIG. 5, another scenario of arrangement of lighting fixtures is shown, wherein it is indicated that the user can easily re-set the groupings of lighting devices, as indicated in FIG. 4 into different groups for remote control. Three groups of lighting devices, as indicated by (502), (503) and (504) in FIG. 4 are again optionally re-set into six groups, namely (506), (507), (508), (509), (510) and (511) for remote control therein.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

I claim:

1. A programmable wireless lighting control system, comprising a gateway provisioned to be connected to a computer or a web-enabled device via a wireless communication; one or more wireless controllers, which are connected to remotely located individual lighting devices and further configured wirelessly to the gateway; and a web-based control platform; and
   wherein said wireless lighting control system comprises a personal mesh network and controls one or a group of the lighting devices, present in remote locations in the personal mesh network of said wireless lighting control system, from a remote place by passing instruction data of a user from the web-enabled device or the computer to the gateway of said system for controlling power supply to the lighting devices at real time, at any future or delayed time;
   wherein the personal mesh network comprises a mesh network of intermediate devices and distant devices for supporting intermittent data transmission from the gateway to the controllers; and
   wherein each of the lighting devices is provided with a unique device identifier, and the lighting devices are grouped in an adjustable way to obtain re-groupable zones, each of which is provided with a system generated unique identifier; the lighting devices are controlled based on the unique device identifier or the system generated unique identifier.

2. The system as in claim 1, wherein the gateway comprises a data module, a processor module, a network module and a data alert module; wherein:
   the data module receives the instruction data via a software platform and/or the web-enabled device;
   the processor module processes the instruction data received or a pre-loaded data to its database towards controlling the power supply to one or more of the lighting devices placed in the personal mesh network;
   the network module creates the personal mesh network for the controllers assembled with the lighting devices at the remote locations; and
   the data alert module generates a command data and transmits it as RF communication beacons to the controllers in the personal mesh network, wherein said command data are based on the instruction data provided by the user, and the command data are transmitted through the mesh network of intermediate devices and distant devices to reach the controllers.

3. The system as in claim 2, each wireless controller is an endpoint, assigned a unique ID code inside the gateway and is remotely located, electrically connected to the lighting devices at the remote locations in the personal mesh network defined by the network module of the gateway; and wherein each controller is fitted with one of the intermediate devices and an electric relay switch.

4. The system as in claim 3, wherein said gateway and the web-based control platform are so provisioned that the user is able to drag-and-drop one or more of the lighting devices to form the zones in the personal mesh network of the system independent of how the lighting devices are wired together; and wherein said re-groupable zones are re-grouped by freely moving one or more of the lighting devices in and out from a selected zone towards simultaneous control thereof and
   wherein said gateway and the web-based control platform are so configured that the user schedules wireless lighting control functions of the system in its personal mesh network, wherein said scheduling is characterized in pre-loading an optional time based instructions to a memory of said gateway; pre-loading a calendar of the pre-loaded instructions; delaying the pre-loaded instructions therein; and re-grouping the lighting devices or their zones already there towards rescheduling the pre-loaded instructions.

5. The system as in claim 2, wherein said controller is provisioned to receive beacons from the data alert module of the gateway in regular intervals and in between the times of the transmitting the beacons, the controller becomes active and responds towards turning On or Off a relay switch, controlling flow of current flowing from a main power supply to the lighting device.

6. The system as in claim 2, wherein said web-based control platform is to be installed in the gateway to enable it towards processing, saving, controlling and transmitting data relating to remote control of the lighting devices, wherein said web-based control platform is characterized in sending the instruction data from the computer or the web-enabled device to the gateway and wherein said web-based control platform is further characterized in transmitting the command data from the gateway of the system to the one or more controllers, each of which is responsible for the power supply to one of the lighting devices.

7. The system as in claim 2, wherein the gateway further comprises a system-on-a-chip (SoC) and a chipset, the data module and the processor module are embedded within the SoC; the chipset is integrated with said SoC such that the processor module is configured to transfer the instruction data to the data alert module for sending the command data to the controllers, or store the instruction data into a memory of the gateway.

8. The system as in claim 7, wherein the chipset comprises an in-system programmable flash memory for causing the personal mesh network to be robust.

9. The system as in claim 1, wherein the web-based control platform for the system enables the gateway to perform:
   management of Application Programming Interface;
   management of the personal mesh network defined for the wireless lighting control system;
   naming of node devices;
   timing control for the node devices;
   status control of the node devices.

10. A method for remote control of lighting devices present in the personal mesh network of the system as in claim 1, wherein said method includes:
   creating the personal mesh network using a network module of the gateway of said system, wherein the personal mesh network covers the lighting devices remotely located;
   receiving the instruction from the user via the web-based control platform and/or any web-enabled device to a data module of the gateway of said system;
   processing said instruction data of the user at a processor module of the gateway of said system;
   transmitting a command data generated by a data alert module of the gateway as RF communication beacons from the data alert module of the gateway of said system to the controllers assembled to the lighting devices presented in the remote locations;
   decoding the command data, received at the controller and accordingly following the command data at the controller by turning On or Off the power supply to the lighting devices associated therein.

11. The method as in claim 10, wherein said method includes:
   selecting an optional group of lighting devices for simultaneous wireless control;
   scheduling wireless lighting control for one or a group of the lighting devices towards power on/off at optionally selected date and time or delaying the already made such schedule; and
   storing the instruction data for the wireless lighting control of one or a group of the lighting devices to a database of the gateway of the system for realizing said instruction data in any future time.

12. The system as in claim 1, wherein the personal mesh network is secured by symmetric encryptions keys.

13. A programmable wireless lighting control system, comprising:
   a gateway provisioned to be connected to a computer or a web-enabled device via a wireless communication;
   one or more wireless controllers, each of which is connected to remotely located lighting devices and further configured wirelessly to the gateway; and
   a web-based control platform;
   wherein said wireless lighting control system further comprises a personal mesh network and controls the lighting devices, present in remote locations in the personal mesh network of said wireless lighting control system, from a remote place by passing instruction data of a user from the web-enabled device or the computer to the gateway of said system for controlling power supply to the lighting devices at real time, at any future or delayed time;
   wherein the personal mesh network comprises a mesh network of intermediate devices and distant devices for supporting intermittent data transmission from the gateway to the controllers;
   wherein each of the lighting devices is provided with a unique device identifier, and the lighting devices are grouped in an adjustable way to obtain re-groupable zones, each of which is provided with a system generated unique identifier; the lighting devices are controlled based on the unique device identifier or the system generated unique identifier;
   wherein the gateway comprises a data module, a processor module, a network module and a data alert module; wherein:
   the data module receives the instruction data via a software platform and/or the web-enabled device;
   the processor module processes the instruction data received or a pre-loaded data to its database towards controlling the power supply to the lighting devices placed in the personal mesh network;
   the network module creates the personal mesh network for the controllers assembled with the lighting devices; and
   the data alert module generates a command data and transmits them as RF communication beacons to the controllers in the personal mesh network, wherein said command data are based on the instruction data provided by the user, and the command data are transmitted through the mesh network of intermediate devices and distant devices to reach the controllers;
   each controller is an endpoint, assigned a unique ID code inside the gateway and is remotely located, electrically connected to the lighting devices in the personal mesh network defined by the network module of the gateway; and wherein each controller is fitted with one of the intermediate devices and an electric relay switch;
   wherein said controllers are provisioned to receive beacons from the data alert module of the gateway in regular intervals and in between times of transmitting the beacons, the controllers become active and respond towards turning On or Off the relay switch, controlling flow of current flowing from a main power supply to the lighting devices;
   wherein said web-based control platform is to be installed in the gateway to enable it towards processing, saving, controlling and transmitting data relating to remote control of the lighting devices, wherein said web-based control platform is characterized in sending the instruction data from the computer or the web-enabled device to the gateway and wherein said web-based control platform is further characterized in transmitting the command data from the gateway of the system to the one or more controllers, each of which is responsible for the power supply to one of the lighting devices; and
   wherein said gateway and the web-based control platform are so provisioned that the user is able to drag-and-drop any one or many of the lighting devices according to the unique ID of each controller to form the zones in the personal mesh network of the system independent of how the lighting devices are wired together; and wherein said zones are further configured to be re-grouped by freely moving one or more of the lighting devices in and out from a selected zone towards simultaneous control thereof.

* * * * *